R. B. PRICE.
MANUFACTURE OF RUBBER ARTICLES.
APPLICATION FILED JAN. 31, 1913.
1,162,397.
Patented Nov. 30, 1915.
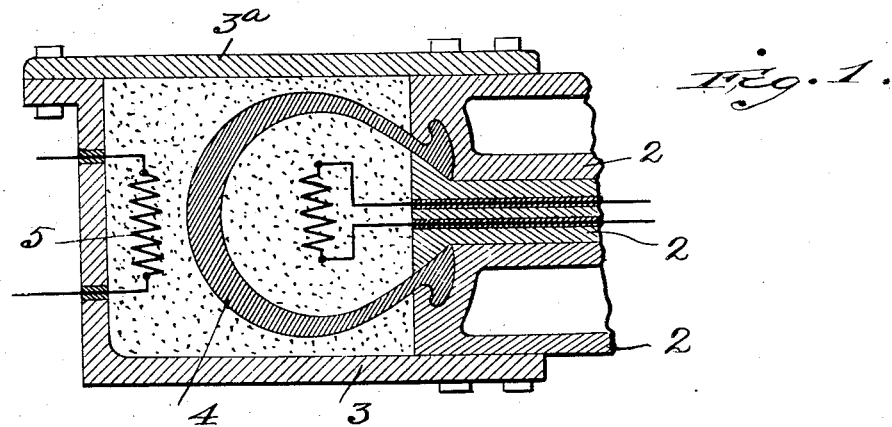
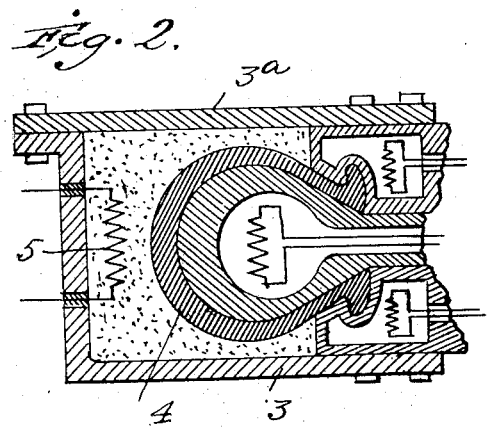
Witnesses
Edwin L. Yewell
A. L. Mills
Inventor
Raymond B. Price
By Percy B. Hills
Attorney

UNITED STATES PATENT OFFICE.

RAYMOND B. PRICE, OF NEW YORK, N. Y., ASSIGNOR TO RUBBER REGENERATING COMPANY, A CORPORATION OF INDIANA.

MANUFACTURE OF RUBBER ARTICLES.

1,162,397. Specification of Letters Patent. Patented Nov. 30, 1915.

Application filed January 31, 1913. Serial No. 745,444.

*To all whom it may concern:*

Be it known that I, RAYMOND B. PRICE, a citizen of the United States, residing in the borough of Manhattan, city of New York, State of New York, have invented new and useful Improvements in the Manufacture of Rubber Articles, of which the following is a specification.

My invention relates to the manufacture of rubber articles, such as automobile tires, and has for its object certain improvements in the apparatus for manufacturing the same, as will be more definitely hereinafter pointed out and claimed, reference being had to the accompanying drawing, in which:

Figure 1 is a transverse sectional view of an apparatus for vulcanizing tires, the same embodying my improved construction and being shown in connection with a tire disposed therein ready for vulcanization. Fig. 2 is a view similar to Fig. 1, showing a modified construction.

In the manufacture of tires it is necessary that the beads or flanges be clamped during the vulcanizing operation in order that they may be properly and accurately shaped, and it is advisable, though not necessary, that the tread surface be sustained against sagging during the initial vulcanizing heat. In Fig. 1 of the accompanying drawing I have shown the beads or flanges 1 of the tire clamped between the usual clamping plates 2, the lower one of the latter having detachably attached thereto a boxlike structure 3 adapted to inclose the tread portion 4 of the tire. Within this box-like portion I may place a mobile material, such as soapstone, sand, mica, or the like, and may, if desired, combine therewith a liquid, such as water or glycerin, said mobile material surrounding and inclosing the tire tread. Detachably attached to the uppermost clamping plate 2 is a cover 3ª fitting closely the box 3 and which may be bolted thereto if pressure is to be applied within the box by any desired means. The contacting surfaces of said box and cover are machined so that in case an exhaust is to be exerted upon the interior of the box a tight joint will be afforded. Said box and cover, being detachable, may be removed from the clamping plates 2 and a tire cured with the employment of said plates alone, leaving the tread of the tire free. And within the tire shoe I may either employ the usual core, or I may employ in place of said core a filling of similar mobile material as that employed to surround the exterior of the tire tread. The tire so positioned is now ready for vulcanization, and I contemplate the application of the vulcanizing heat by means of a series of electric resistance coils 5 disposed in the mobile material surrounding the tire tread, and also, if said material is used in place of a core, within that portion disposed within the tire body. By the application of an electric current in the usual manner the necessary vulcanizing heat may be attained and the tire vulcanized.

An important advantage obtained by disposing the tread surface of the tire in a mobile material during the vulcanizing operation is that the said mobile material, while supporting the tire tread at the same time, permits the tire shoe, when heated, to expand or change shape to conform more nearly to the configuration of its contained fabric threads, whereby the latter are permitted to adjust themselves evenly throughout the tire tread, and will, when the vulcanization is complete, be disposed in position to most favorably receive the strain imposed upon the tire tread.

My invention also contemplates providing the clamps for the beads or flanges with either an electric resistance coil or with passages for the reception of the heating medium, whereby said beads or flanges may be separately and controllably heated.

In the employment of this apparatus I contemplate the use therewith of controllable vacuums or pressures, or both, both inside and outside the tire shoe, as disclosed in certain applications for patent heretofore filed by me. And I wish to be understood as contemplating the use of any combination of the above described features, that is to say, the mobile fillings, the vacuums, the pressures, both inside the tire shoe and in the box 3. Or I may remove the box 3 and its cover 3ª and vulcanize the tire without any inclosure for the tread thereof, and with a core of any description, solid or fluid.

Having thus described my invention, what I claim as new and desire to secure by Letters Patent is:

1. An apparatus for vulcanizing tires, embodying means for clamping and shaping the beads or flanges of the tire, a container surrounding the tread portion of the tire, a filling of mobile material disposed in said container and contacting with the tread portion of said tire, whereby at the initial vulcanizing heat the rubber of the tire may change shape sufficiently to permit the fabric threads therein to adjust themselves to the position of maximum efficiency, and an electric resistance coil disposed in said mobile material to apply to the tire shoe the vulcanizing heat.

2. An apparatus for vulcanizing tires, embodying means for clamping and shaping the beads or flanges of the tire, a container surrounding the tread portion of the tire, an electric resistance coil disposed in said container to apply to the tire shoe heat for vulcanizing, and a removable filler disposed in said container for directly transmitting the heat from the coil to the tire.

3. An apparatus for vulcanizing tires, embodying means for clamping and shaping the beads or flanges of the tire while leaving the remainder of the tire freely suspended, a container surrounding the tread portion of the tire, a filling of mobile material disposed in said container and contacting with the suspended portion of said tire on both sides thereof whereby at the initial vulcanizing heat the rubber of the tire may change shape sufficiently to permit the fabric threads therein to adjust themselves to the position of maximum efficiency, and an electric resistance coil disposed in said mobile material to apply to the tire shoe the vulcanizing heat.

4. An apparatus for vulcanizing tires, embodying means for clamping and shaping the beads or flanges of the tire while leaving the remainder of the tire freely suspended, a container surrounding the tread portion of the tire, electric resistance coils disposed in said container on each side of said suspended tire to apply thereto heat for vulcanizing, and a removable filler disposed in said container and surrounding the coils on each side of the tire for directly transmitting the heat from the coil to the tire.

In testimony whereof, I have hereunto set my hand in the presence of two subscribing witnesses.

RAYMOND B. PRICE.

Witnesses:
  PERCY B. HILLS,
  A. L. MILLS.